(12) United States Patent
Ponce et al.

(10) Patent No.: US 10,872,050 B1
(45) Date of Patent: *Dec. 22, 2020

(54) BIT-MAPPED DMA TRANSFER WITH DEPENDENCY TABLE CONFIGURED TO MONITOR CHANNEL BETWEEN DMA AND ARRAY OF BITS TO INDICATE A COMPLETION OF DMA TRANSFER

(71) Applicant: BITMICRO LLC, Reston, VA (US)

(72) Inventors: Cyrill C. Ponce, Malabon (PH);
Marizonne O. Fuentes, Tanauan (PH);
Gianico G. Noble, San Pedro (PH)

(73) Assignee: BiTMICRO LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,064

(22) Filed: Aug. 5, 2019

Related U.S. Application Data

(63) Continuation of application No. 16/056,563, filed on Aug. 7, 2018, now Pat. No. 10,372,643, which is a continuation of application No. 15/603,434, filed on May 23, 2017, now Pat. No. 10,042,799, which is a continuation of application No. 14/687,700, filed on Apr. 15, 2015, now Pat. No. 9,672,178, which is a
(Continued)

(51) Int. Cl.
*G06F 13/00* (2006.01)
*G06F 13/37* (2006.01)
*G06F 13/28* (2006.01)
*G06F 3/06* (2006.01)

(52) U.S. Cl.
CPC .............. *G06F 13/37* (2013.01); *G06F 3/061* (2013.01); *G06F 3/0656* (2013.01); *G06F 3/0683* (2013.01); *G06F 13/28* (2013.01); *G06F 13/287* (2013.01)

(58) Field of Classification Search
CPC .............................. G06F 13/37; G06F 13/287
See application file for complete search history.

(56) References Cited

U.S. PATENT DOCUMENTS 8,930,620 B2 * 1/2015 Vemuri ................. G06F 3/0613
711/114
9,400,617 B2 * 7/2016 Ponce ................... G06F 3/0683
(Continued)

*Primary Examiner* — Tammara R Peyton
(74) *Attorney, Agent, or Firm* — Jackson Walker L.L.P.

(57) ABSTRACT

In an embodiment of the invention, a method comprises: A method, comprising: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table. In another embodiment of the invention, an apparatus comprises: a Direct Memory Access (DMA) engine configured to issue an update request to a dependency table if the DMA engine has finished executing a first descriptor, and configured to issue a monitoring request if the DMA engine is executing a second descriptor that depends on a completion of a data transfer so that the DMA engine can monitor a status of a selected subindex related to the data transfer, wherein the subindex is in the dependency table.

7 Claims, 4 Drawing Sheets

Related U.S. Application Data continuation-in-part of application No. 14/217,467, filed on Mar. 17, 2014, now Pat. No. 9,400,617.

(60) Provisional application No. 61/979,878, filed on Apr. 15, 2014, provisional application No. 61/802,367, filed on Mar. 15, 2013.

(56) References Cited

U.S. PATENT DOCUMENTS

| | | | |
|---|---|---|---|
| 9,501,436 B1* | 11/2016 | Bruce | G06F 13/28 |
| 9,672,178 B1* | 6/2017 | Ponce | G06F 13/37 |
| 10,042,799 B1* | 8/2018 | Ponce | G06F 13/37 |
| 10,372,643 B1* | 8/2019 | Ponce | G06F 3/061 |
| 2011/0196994 A1* | 8/2011 | Harada | G06F 13/28 |
| | | | 710/22 |

* cited by examiner

| Field 1: Request type | Field 2: index number | Field 3: subindex number | Field 4: depends on request type |
|---|---|---|---|
| update | Index number | Subindex number | NA |
| monitor | Index number | Subindex number | Monitoring channel number |

BIT-MAPPED DMA TRANSFER WITH DEPENDENCY TABLE CONFIGURED TO MONITOR CHANNEL BETWEEN DMA AND ARRAY OF BITS TO INDICATE A COMPLETION OF DMA TRANSFER

This application is a continuation of application Ser. No. 16/056,563, filed 7 Aug. 2018 and issuing as U.S. Pat. No. 10,372,643 on 6 Aug. 2019, which is a continuation of application Ser. No. 15/603,434, filed 23 May 2017 and issued as U.S. Pat. No. 10,042,799 on 7 Aug. 2018, which is a continuation of application Ser. No. 14/687,700, filed 15 Apr. 2015 and issued as U.S. Pat. No. 9,672,178 on 6 Jun. 2017, which is a continuation in part of application Ser. No. 14/217,467, filed 17 Mar. 2014 and issued as U.S. Pat. No. 9,400,617 on 26 Jul. 2016, which claims priority from App. No. 61/802,367, filed 15 Mar. 2013. Application Ser. No. 14/687,700, filed 15 Apr. 2015 and issued as U.S. Pat. No. 9,672,178 on 6 Jun. 2017, also claims the benefit of U.S. Provisional Application 61/979,878, filed Apr. 17, 2014. Each of these applications is incorporated by reference herein, in its entirety.

FIELD OF INVENTION

Embodiments of the invention relate generally to a data storage system which is applied to a computer system that includes volatile (e.g., SRAM, SDRAM) and non-volatile (e.g., flash memory, mechanical hard disk) storage components.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

Conventionally, with data transfer systems without a dependency table, the approach is to use a buffer. Data is transferred from a memory to a buffer and then from the buffer to an IO (input/output) bus. Also, data is transferred from the IO bus to the buffer and then from the buffer to the memory. In order to ensure the transfer of valid data, a DMA (direct memory access engine) with full-time processor intervention through reception of interrupts is required. For example, every after data transfer from the IO bus to the buffer, the processor will receive an interrupt signifying that the data needed by the memory is already in the buffer, and vice versa.

1. Long Data Latency

The prior approach has no hardware-assisted concept of dependency which results to more reliance on firmware (i.e., in between transfer boundaries, the processor has to interfere to setup and enable the next transfer). These operations result in utilizing precious processor cycles.

2. High Probability of Invalid Data

Since the firmware takes the responsibility of keeping track of the data and, considering the fact that the processor is also doing other background tasks, the data being tracked is subject to high risk of being lost.

Accordingly, various conventional approaches suffer from at least the above-mentioned deficiencies and/or disadvantages.

SUMMARY

Embodiments of the invention relate generally to a data storage system which is applied to a computer system that includes volatile (e.g., SRAM, SDRAM) and non-volatile (e.g., flash memory, mechanical hard disk) storage components.

A basis of an embodiment of the invention is the Hardware-assisted DMA Transfer with Dependency. One or more of the features in commonly-owned and commonly-assigned U.S. patent application Ser. No. 14/217,467 may apply in one or more embodiments of the invention. An embodiment of the invention, which is a bit-mapped dependency table, is one application or implementation of a dependency table in a system disclosed in U.S. patent application Ser. No. 14/217,467.

An embodiment of the present invention provides a feature for a hardware-based step-by-step data transfer completion notification mechanism between the processor and DMA (Direct Memory Access) engines. An embodiment enables the execution time of the processor to focus on setting-up of DMA engines, rather than being the one to enable the dependent DMA engines to run exactly at the time when the data to be transferred is already waiting for processing in the memory, which renders the processor as the bottleneck of system.

In an embodiment of the invention, a method comprises: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table.

In another embodiment of the invention, an article of manufacture, comprises: a non-transient computer-readable medium having stored thereon instructions that permit a method comprising: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table.

In yet another embodiment of the invention, an apparatus comprises: a Direct Memory Access (DMA) engine configured to issue an update request to a dependency table if the DMA engine has finished executing a first descriptor, and configured to issue a monitoring request if the DMA engine is executing a second descriptor that depends on a completion of a data transfer so that the DMA engine can monitor a status of a selected subindex related to the data transfer, wherein the subindex is in the dependency table.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

FIG. 1B is a diagram illustrating fields in an update request or monitor request issued by a DMA (Direct Memory Access) engine, in accordance with an embodiment of the invention.

DETAILED DESCRIPTION

Figure 1A:
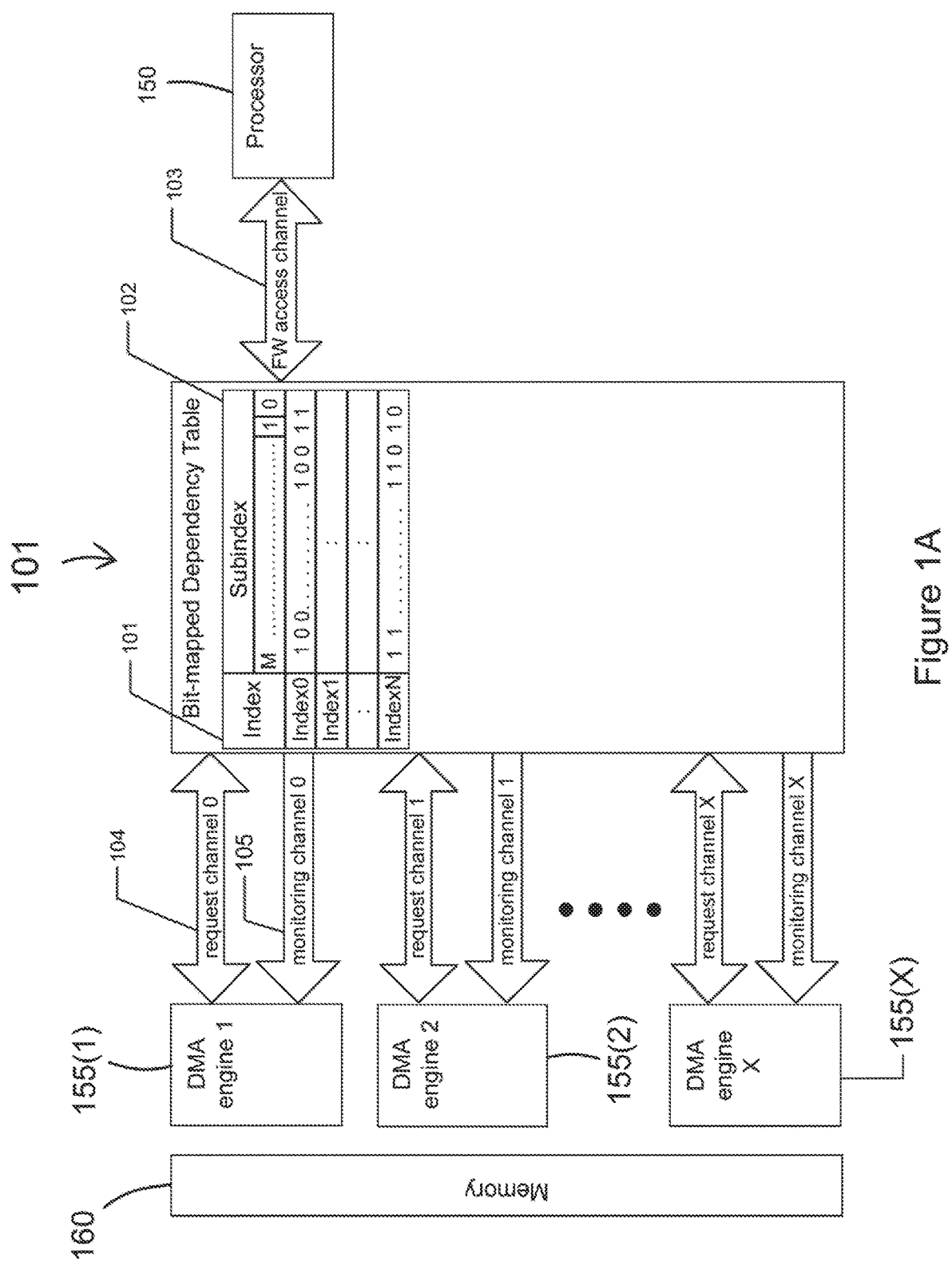
FIG. 1A is a diagram illustrating a bit-mapped dependency table, in accordance with an embodiment of the invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in anyway. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . " Also, the term "couple" (or "coupled") is intended to mean either an indirect or direct electrical connection. Accordingly, if one device is coupled to another device, then that connection may be through a direct electrical connection, or through an indirect electrical connection via other devices and/or other connections.

An embodiment of the invention, which is a bit-mapped dependency table, is one application or implementation of a dependency table in a system for hardware-assisted DMA transfer with dependency disclosed in U.S. patent application Ser. No. 14/217,467.

An embodiment of the present invention provides a feature for a hardware-based step-by-step data transfer completion notification mechanism between the processor and DMA engines. An embodiment enables the execution time of the processor to focus on setting-up of DMA engines, rather than being the one to enable the dependent DMA engines to run exactly at the time when the data to be transferred is already waiting for processing in the memory, which renders the processor as the bottleneck of system.

FIG. 1A is a diagram illustrating a bit-mapped dependency table 100 in a system 101, in accordance with an embodiment of the invention. The table 100 is composed of N number of indices 101, each index includes an M number of subindices 102, and each subindex corresponds to the status of a DMA engine transfer. In FIG. 1A, the indices 101 includes Index O, Index 1, through Index N. The numbers M and N may be any suitable integer numbers. A '1' indicates that a transfer is done or completed, and a '0' indicates that a transfer is still pending.

The table 100 also has the following interfaces: FW (firmware) access channel 103, request channels 104 (ranging from 0 to X, where X is a suitable integer number) (i.e., request channels (0) to (X) 104), and monitoring channels 105 (ranging from O to X) The other blocks in the drawing (processor 150, DMA engines 155(1), 155(2) through 155 (X) and referred to general as DMA engine(s) 155, and memory 160) are not part of a bit-mapped dependency table in one embodiment of the invention. Upon power on reset, all subindices 101 are initialized to a status of '1', signifying that there are no pending data transfers. The processor 150 writes to or reads in the table 100 on a per index basis using the FW access channel 103, and, therefore, it is recommended that the processor 150 assigns the subindices 102 of related DMA engine transfers in a single index 101, and that the processor 150 perform these assignments in a single index write for fast execution.

The processor 150 also sets up descriptors in memory such that each descriptor correspond to a certain DMA engine transfer, and each DMA engine transfer corresponds to a certain subindex 102 bit in the dependency table 100. Once a sufficient number of descriptors are setup, the processor 150 can enable the DMA engines 155 to execute the descriptors in memory. Dependent descriptors, which are descriptors which will only be processed by a DMA engine 155 when certain transfers are already done, request to monitor the status of the subindex in which its transfer depend on, using request channel 104. As a result of these requests, the DMA engines 155 can monitor the status of a selected index (subindex bits) using monitoring channels 105. In case of an error in a data transfer, related descriptors can be aborted and disabled by the processor 150 in memory, the concerned DMA engines 155 can also be stopped, and the processor 150 then writes all '1' in the index related to the aborted transfers in the dependency table 100. Since it was mentioned that the status subindices 102 of related data transfers is recommended to be assigned in a single index 101, the processor 150 can force the status of related transfers to '1' in a single index write, usually signifying that the related transfers are already finished, but in this case they were aborted.

An example of an actual process of using a Bit-mapped Dependency Table was discussed in the system for Hardware-assisted DMA Transfer with Dependency as disclosed in U.S. patent Ser. No. 14/217,467.

The request channels 104 and monitoring channels 105 are typically tightly coupled, as will be discussed later in this disclosure, and will be started with the discussion of the formats of the two types of requests to the dependency table 100 as shown in Table 1 and FIG. 1B.

TABLE 1

| Field 1: Request | Field 2: index number | Field 3: subindex number | Field 4: depends on request type |
|---|---|---|---|
| Update | Index number | Subindex number | NA |
| Monitor | Index number | Subindex number | Monitoring channel number |

An update request will be issued by a DMA engine 155 if that DMA engine 155 is already finished executing a descriptor, which means that DMA engine 155 is already finished with a transfer. The update request instructs the dependency table 100 to switch a subindex bit from '0' to '1'. A target subindex 102 to be switched is addressed by field 2 and field 3 as shown in Table 1.

A monitoring request will be issued by a DMA engine 155 if the descriptor that it is executing depends on a prior transfer to finish. The monitoring request instructs the dependency table 100 to route a particular subindex bit out to a monitoring channel bit (field 4 in Table 1). The requesting DMA engine 155 monitors the monitoring channel bit, which in effect means that the requesting DMA engine 155 actually monitors the target subindex 102. The subindex 102 to be monitored represents the status of the transfer that the current transfer depends on. The target subindex 102 to be monitored is addressed by field 2 and field 3. Since a monitoring channel 105 is composed of many number of bits (which depends on design and application), field 4 selects in which the monitoring channel bit that the selected target subindex 102 will be monitored on.

Figure 2:
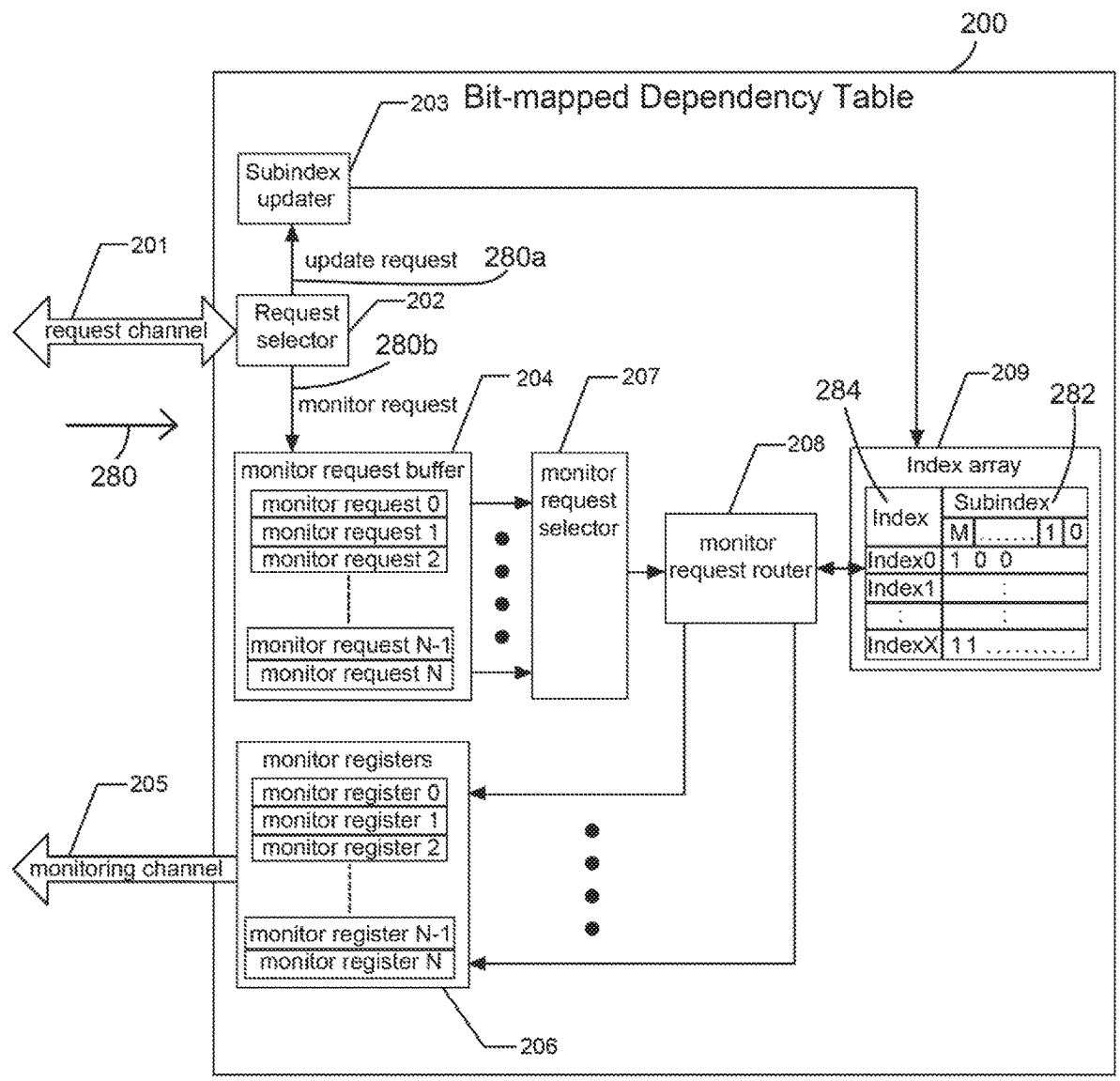
FIG. 2 is a diagram of internal blocks of a bit-mapped dependency table, wherein the internal blocks are involved with the execution of a request, in accordance with an embodiment of the invention.

FIG. 2 is a diagram of internal blocks of a bit-mapped dependency table 200, wherein the internal blocks are involved with the execution of a request, in accordance with an embodiment of the invention.

FIG. 2 shows an example request channel 201 and the relationship of the channel 201 to its corresponding monitoring channel 205. A request 280 is issued by a DMA engine 155 (FIG. 1A) using request channel 201, and a request selector 202 routes the request 280. If the request 280 is an update request 280a, the request 280 is routed to subindex updater 203, wherein the target subindex 282 (in indices 284) is immediately updated in index array 209. If the request 280 is a monitor request 280b, the request 280 is routed by the request selector 202 to monitor request buffer 204. The monitoring channel number field in the monitor request 280b determines the monitor request number in the monitor request buffer 204. The monitor request numbers are shown as monitor request 0, monitor request 1, monitor request 2 through monitor request N−1 and monitor request N. For example, a monitor request 280b for monitoring channel 205 bit 2 will be placed in monitor request 2, and upon routing to monitoring channel 205 bit 2, will be stored in monitor register 2 in the monitor registers 206. The monitor request selector 207 selects which monitor request 280b will be executed by monitor request router 208. The algorithm of monitor request selector 207 varies from, but not limited to, arbitrated (if monitor request buffer 204 is partially filled) and round-robin (if monitor request buffer 204 is full). The algorithm is typically optimized for fastest execution of the requests 280b in the monitor request buffer 204. Once a monitor request 280b is selected, monitor request router 208 routes the target subindex 282 from index array 209 to the corresponding monitor register in monitor registers 206, and subsequently out to the corresponding bit in monitoring channel 205.

Figure 3:
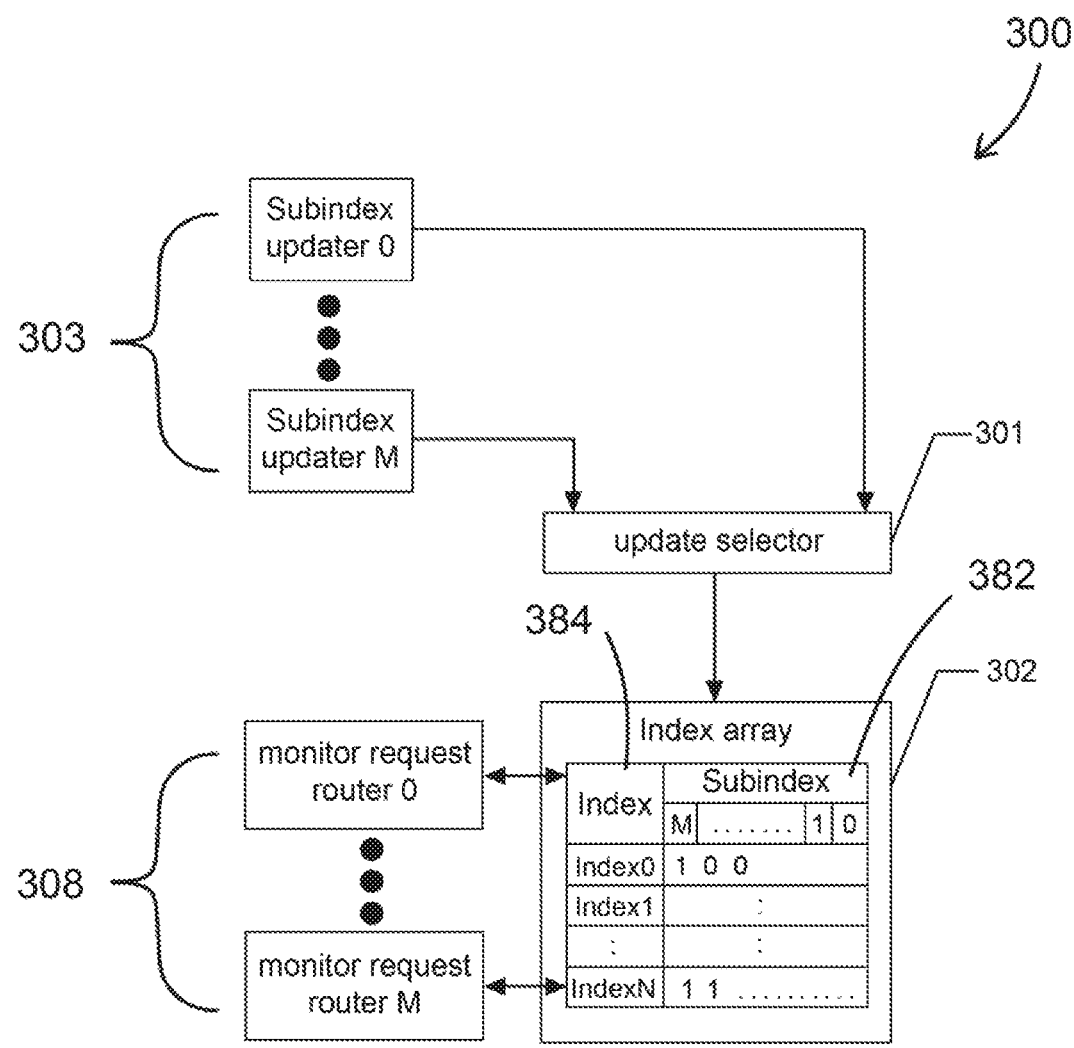
FIG. 3 is a diagram of an example bit-mapped dependency table with multiple subindex updaters and multiple monitor request routers, in accordance with an embodiment of the invention.

FIG. 3 is a diagram of an example bit-mapped dependency table 300 with multiple subindex updaters 303 and multiple monitor request routers 308, in accordance with an embodiment of the invention. The multiple subindex updaters 303 are shown by subindex updater O through subindex updater M), for example, and the multiple monitor request routers 308 are shown by monitor request router O through monitor request router M), for example. The bit-mapped dependency table 300 also includes the other internal blocks of the bit-mapped dependency table 200 if FIG. 2, but are omitted in FIG. 3 for purposes of brevity or clarity.

These multiple subindex updaters 303 and multiple monitor request routers 308 are used when there are multiple DMA engines 155 connected to the dependency table 100 like the one shown in FIG. 1, which means that there are multiple request channels 104 (FIG. 1) and multiple monitoring channels 105. For update requests, the update selector 301 selects which subindex updater 303 will be granted to write to index array 302. The update selector 301 gives fair write grant opportunities to all subindex updaters 303 such as, for example, by use of a round-robin selection process or another arbitration process. Since subindex monitoring is a read only operation, multiple monitor request routers 308 can read the subindices 382 (in indices 384) in index array 302 at the same time.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for monitoring data transfers associated with one or more direct memory access (DMA) engines, the method comprising:
    maintaining data transfer completion (DTC) information indicative of a completion status for each of the data transfers, wherein the DTC information includes an array of DTC bits wherein each DTC bit in the array is identified by a tuple comprising an index and a subindex and wherein maintaining the DTC information includes;
    assigning a tuple to each of the data transfers;
    responsive to receiving, from a DMA engine completing a first DMA transfer associated with a first tuple, an update request indicative of the first tuple, setting a DTC bit corresponding to the first tuple to a value indicative of a completion of the first DMA transfer; and
    responsive to receiving, from a DMA engine executing a dependent data transfer, a monitoring request indicative of a second tuple and further indicative of a particular bit of a monitoring channel, configuring a monitoring channel between the DMA engines and the array of DTC bits, wherein a value of a DTC bit corresponding to the second tuple is indicated on the particular bit of the monitoring channel.

2. The method of claim 1, wherein maintaining the DTC information comprises accessing, by a processor coupled to the array of DTC bits, the array of DTC bits on a per index basis wherein each subindex associated with a particular index is accessed whenever any subindex associated with the particular index is accessed.

3. The method of claim 1, wherein maintaining the DTC information includes assigning, by the processor, tuples for related data transfers to a single index.

4. The method of claim 1, further comprising: setting up descriptors corresponding each DMA transfer.

5. The method of claim 1, wherein the update request and the monitoring request are both on a request channel coupling the array of DTC bits and the one or more DMA engines.

6. The method of claim 5, further comprising buffering monitoring requests in a monitoring request buffer until selected by a monitor request selector.

7. The method of claim 1, wherein configuring the monitoring channel comprises configuring a monitor request router to route the value of the DTC bit corresponding to the second tuple to a monitor register corresponding to the particular bit of the monitoring channel.

* * * * *